US009007610B2

(12) United States Patent
Arai et al.

(10) Patent No.: US 9,007,610 B2

(45) Date of Patent: Apr. 14, 2015

(54) SYSTEM-SPEED SWITCHABLE IMAGE FORMING DEVICE

(71) Applicant: Konica Minolta Inc., Chiyoda-ku (JP)

(72) Inventors: Junichi Arai, Chiryu (JP); Kenji Taki, Toyokawa (JP)

(73) Assignee: Konica Minolta, Inc., Chiyoda-Ku, Tokyo (JP)

(*) Notice: Subject to any disclaimer, the term of this patent is extended or adjusted under 35 U.S.C. 154(b) by 0 days.

(21) Appl. No.: 14/090,114

(22) Filed: Nov. 26, 2013

(65) Prior Publication Data

US 2014/0147154 A1 May 29, 2014

(30) Foreign Application Priority Data

Nov. 27, 2012 (JP) ................................. 2012-258185

(51) Int. Cl.

*G06F 15/00* (2006.01)
*G06F 3/12* (2006.01)
*G06K 1/00* (2006.01)
*G03G 15/00* (2006.01)
*G03G 21/18* (2006.01)

(52) U.S. Cl.

CPC ............ *G03G 15/5066* (2013.01); *G03G 15/50* (2013.01); *G03G 21/1889* (2013.01); *G03G 2215/00949* (2013.01)

(58) Field of Classification Search

CPC ..... G06F 3/1297; G06F 3/1296; G06K 15/02; G06G 15/5066; G06G 15/50
USPC .................................................. 358/1.13, 1.1
See application file for complete search history.

(56) References Cited

U.S. PATENT DOCUMENTS

| | | | | |
|---|---|---|---|---|
| 5,574,527 | A | 11/1996 | Folkins | |
| 5,710,956 | A | 1/1998 | Kurohata et al. | |
| 6,341,203 | B1 | 1/2002 | Nakazato et al. | |
| 2002/0025179 | A1 | 2/2002 | Toyohara et al. | |
| 2007/0134012 | A1 | 6/2007 | Suzuki et al. | |
| 2010/0073492 | A1* | 3/2010 | Kudo | 348/208.1 |
| 2011/0123211 | A1* | 5/2011 | Kooriya et al. | 399/61 |

FOREIGN PATENT DOCUMENTS

| | | |
|---|---|---|
| JP | 08-087213 A | 4/1996 |
| JP | 09-114149 A | 5/1997 |

(Continued)

OTHER PUBLICATIONS

Office Action (Notice of Allowance) issued on Feb. 17, 2015, by the Japan Patent Office in corresponding Japanese Patent Application No. 2012-258185, and an English Translation of the Office Action. (6 pages).

*Primary Examiner* — Douglas Tran

(74) *Attorney, Agent, or Firm* — Buchanan Ingersoll & Rooney PC

(57) ABSTRACT

An image forming device switches a system speed when assignment of a license has been accepted, and stores switching information of the system speed. The image forming device performs two-stage image stabilization for determining a setting value of a parameter relating to an image formation process of the image forming device when the switching information of the system speed is stored, and performs single-stage image stabilization for determining a setting value of the parameter relating to the image formation process of the image forming device when the switching information of the system speed is not stored.

21 Claims, 15 Drawing Sheets

(56) References Cited

FOREIGN PATENT DOCUMENTS

| | | | |
|---|---|---|---|
| JP | 2001-075319 | A | 3/2001 |
| JP | 2002-148878 | A | 5/2002 |
| JP | 2005-316118 | A | 11/2005 |
| JP | 2007-156272 | A | 6/2007 |
| JP | 2007-178928 | A | 7/2007 |
| JP | 2009-116144 | A | 5/2009 |
| JP | 2009-258456 | A | 11/2009 |
| JP | 2010-091920 | A | 4/2010 |

* cited by examiner

FIG.5

RELATION BETWEEN MODELS AND FIRMWARE

| MODEL | PRODUCTIVITY(ppm) | RESOLUTION(dpi) | SYSTEM SPEED | FIRMWARE |
|---|---|---|---|---|
| A | 36 | 1200 | V1 | A |
| B | 28 | 1200 | V2 | B |
| C | 22 | 600 | V3 | C |

SYSTEM-SPEED SWITCHABLE IMAGE FORMING DEVICE

This application is based on Japanese Patent Application No. 2012-258185 filed with the Japan Patent Office on Nov. 27, 2012, the entire content of which is hereby incorporated by reference.

BACKGROUND OF THE INVENTION

1. Field of the Invention

The present invention relates to image forming devices capable of switching a system speed, and in particular, to an image forming device capable of performing two-stage image stabilization and single-stage image stabilization.

2. Description of the Related Art

Examples of electrophotographic image forming devices include MFPs (Multi Function Peripherals) having a scanner function, a facsimile function, a copier function, a printer function, a data communication function, and a server function, facsimile machines, copying machines, printers, and the like.

An optimal value of a parameter relating to image formation by an image forming device changes according to an environment in which the image forming device is placed, a system speed, or the like. Therefore, the image forming device performs image stabilization process for optimizing a parameter relating to image formation at the factory before shipment, when an environment in which the image forming device is placed changes, or when a component such as a developing device is replaced.

There are two types of image stabilization: two-stage image stabilization and single-stage image stabilization.

The two-stage image stabilization is image stabilization performed in the following two stages. As first image stabilization, the image forming device once resets all parameters relating to the image formation process, forms a plurality of sampling images on an image carrier while changing the parameters in a broad adjustable range, reads the sampling images by an IDC (Image Density Control) sensor or the like, and determines parameters providing an optimal sampling image as provisional setting values (approximate setting values). Then, as second image stabilization, the image forming device forms a plurality of sampling images on the image carrier while changing the parameters in a narrow adjustable range including the provisional setting values, and determines parameters providing an optimal sampling image as setting values based on the sampling images in the same manner as in the first stabilization.

The single-stage image stabilization is image stabilization performed in the following single stage. The image forming device forms a plurality of sampling images on the image carrier while changing the parameters in a narrow adjustable range including setting values that have already been determined, reads the sampling images by an IDC sensor or the like, and determines parameters providing an optimal sampling image as setting values.

Time required for the two-stage image stabilization is overwhelmingly longer than time required for the single-stage image stabilization. In order to reduce time required for the image stabilization, the two-stage image stabilization is generally performed in a case where the setting values are predicted to change to a large extent, such as at the factory before shipment (in the production line), or when a component such as a developing device is replaced. In a case where the setting values are predicted not to change largely, such when an environment in which the image forming device is placed changes, the single-stage image stabilization is performed.

The technique relating to the image stabilization is disclosed, for example, in Documents 1 and 2 listed below.

Document 1 discloses an image forming device having a color deviation correction mode with which positions for forming single-color toner images are corrected based on detected values of color deviation amounts when superimposing single-color toner images. This image forming device stores the fact that the color deviation correction mode has been carried out after execution of the color deviation correction mode, and performs an initial color-deviation correction mode if the color deviation correction mode has not been carried out before.

Document 2 listed below discloses an image forming device performing an initialization process, which is to be performed when a new component is installed, if a machine status is in a state when the device is installed after replenishing a hopper with a toner.

[Document 1] Japanese Patent Publication Laying-Open No. 2005-316118

[Document 2] Japanese Patent Publication Laying-Open No. 08-087213

There is proposed a new business model in which image forming devices of different models are manufactured by installing firmware corresponding to the models in image forming devices having the same hardware configuration, and thus productivity corresponding to each model is achieved. According to this business model, while the hardware configuration of the image forming devices may be standardized between models on one hand, it is possible to differentiate performances of the image forming devices by selecting the firmware corresponding to a license assigned to one image forming device (a user-purchased model) to set the model of the image forming device.

According to this business model, by installing firmware for a specific model in image forming devices in a production line, image forming devices of the specific model are manufactured. When the stock of the image forming devices of the specific model is short in a storehouse where image forming devices are stored after manufacture, model change to the specific model (upgrade or downgrade) is carried out by assigning a new license to completed image forming devices of a different model.

As a result, image forming devices delivered to customers include those delivered as a model that has been set in the production line, as well as those that have gone through model change in the storehouse after completion. For the image forming devices delivered as a model that has been set in the production line, a system speed has not been changed after image stabilization is performed in the production line, and therefore essentially, only single-stage image stabilization needs to be performed at a customer's place. However, for the image forming devices that have gone through model change after completion, the system speed has been changed after image stabilization is performed in the production line, and therefore two-stage image stabilization needs to be performed at the customer's place.

It is unknown whether or not an image forming device delivered to the customer has gone through model change after completion. Accordingly, a serviceman who sets up image forming devices at the customer's place has to manually perform two-stage image stabilization for all the image forming devices. As a result, there is a problem that setup efficiency at the customer's place adversely decreases. There is also a problem that the serviceman often forgets and fails to perform the image stabilization.

It is also conceivable of a method in which, when model change is performed to an image forming device in the storehouse after completion, an operator causes the image forming device to execute two-stage image stabilization. However, image forming devices are stored in a packed state in the storehouse, and driving members of the image forming devices are fixed so as not to move casually. Accordingly, if the operator attempts to cause an image forming device to execute image stabilization, it is necessary to once unpack the image forming device so that a mechanical operation of the image forming device is possible, and an extended time period is adversely required to unpack and repack the image forming device. Therefore, this method has not been practical.

SUMMARY OF THE INVENTION

The present invention has been made in order to solve the above problems, and an object thereof is to provide an image forming device capable of improving setup efficiency at a customer's place.

Another object of the present invention is to provide an image forming device capable of preventing image stabilization from not being performed.

An image forming device according to one aspect of the present invention includes: a license accepting unit for accepting assignment of a license; a switching unit for switching a system speed when the assignment of the license has been accepted by the license accepting unit; a storing unit for storing information indicating that the system speed has been switched when the system speed has been switched by the switching unit; a switch determination unit for determining whether or not the information indicating that the system speed has been switched is stored in the storing unit; a first image stabilization unit for performing two-stage image stabilization when it is determined by the switch determination unit that the information is stored, the two-stage image stabilization being a process for determining a setting value of a parameter relating to an image formation process of the image forming device; and a second image stabilization unit for performing single-stage image stabilization when it is determined by the switch determination unit that the information is not stored, the single-stage image stabilization being a process for determining the setting value, wherein in the two-stage image stabilization, a provisional setting value of the parameter is determined within a first adjustable range based on sampling images formed using a plurality of values of the parameter that are different from each other and within the first adjustable range, and the setting value is determined within a second adjustable range narrower than the first adjustable range and including the provisional setting value based on sampling images formed using a plurality of values of the parameter that are different from each other and within the second adjustable range, and in the single-stage image stabilization, the setting value is determined within a third adjustable range including an already determined setting value based on sampling images formed using a plurality of values of the parameter that are different from each other and within the third adjustable range.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram schematically illustrating a relation between models and firmware of the image forming device.

DESCRIPTION OF THE PREFERRED EMBODIMENTS

Hereinafter, one embodiment of the present invention will be described with reference to the drawings.

An image forming device according to the present embodiment performs image formation based on an electrophotographic method or an electrostatic recording method. The image forming device according to the present embodiment may be an MFP having a scanner function, a facsimile function, a copier function, a printer function, a data communication function, and a server function, a facsimile machine, a copying machine, a printer, or the like. An image-processing system may be a system including, in place of the image forming device, an image-processing device such as a PC (Personal Computer) or a scanner.

[Configuration of Image Forming Device]

First, a configuration of the image forming device according to the present embodiment will be described.

Figure 1:
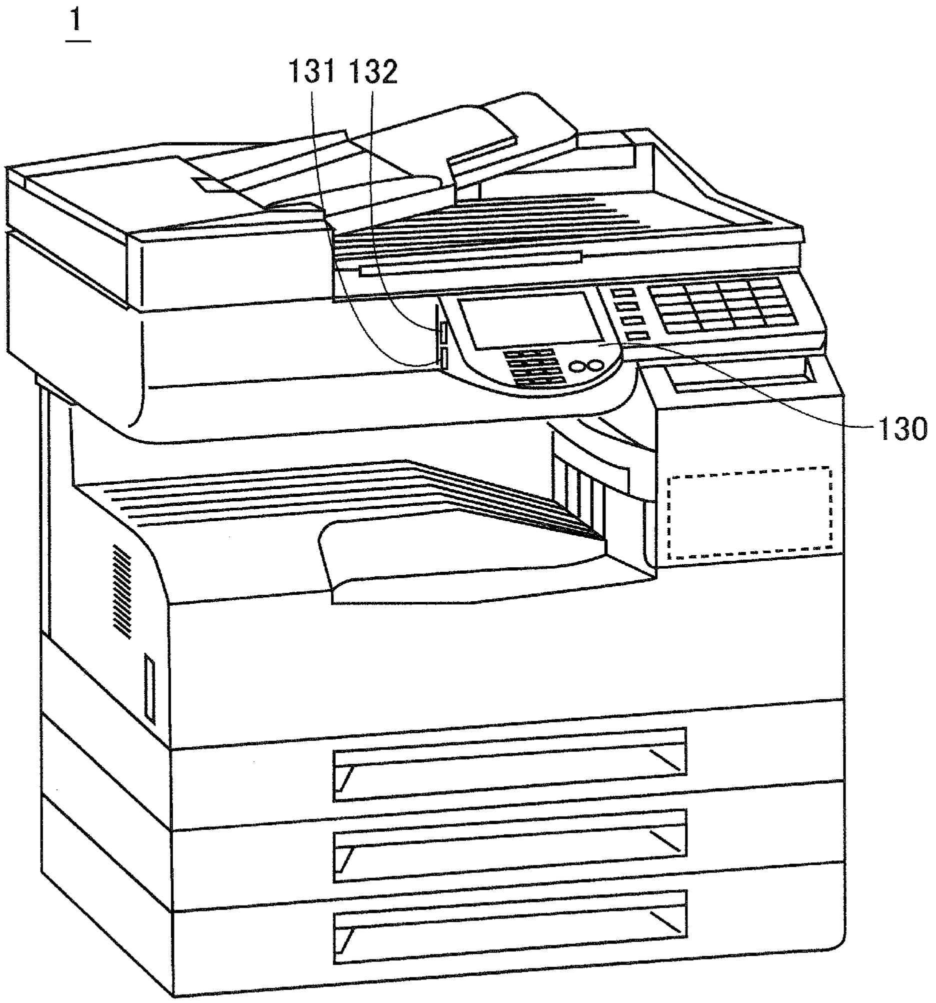
FIG. 1 is a diagram schematically illustrating an appearance of an image forming device according to one embodiment of the present invention.

Referring to FIG. 1, an image forming device 1 here is an MFP, having an operating panel 130 on its front surface and ports 131 and 132. Operating panel 130 is provided on a front surface of a main body of image forming device 1, for example. Ports 131 and 132 are provided on a side surface of operating panel 130, for example. Port 131 is a USB terminal, for example, to which an external device such as a license card or a line card is connected. Port 132 is a LAN terminal to which a LAN (Local Area Network) cable is connected.

Figure 2:
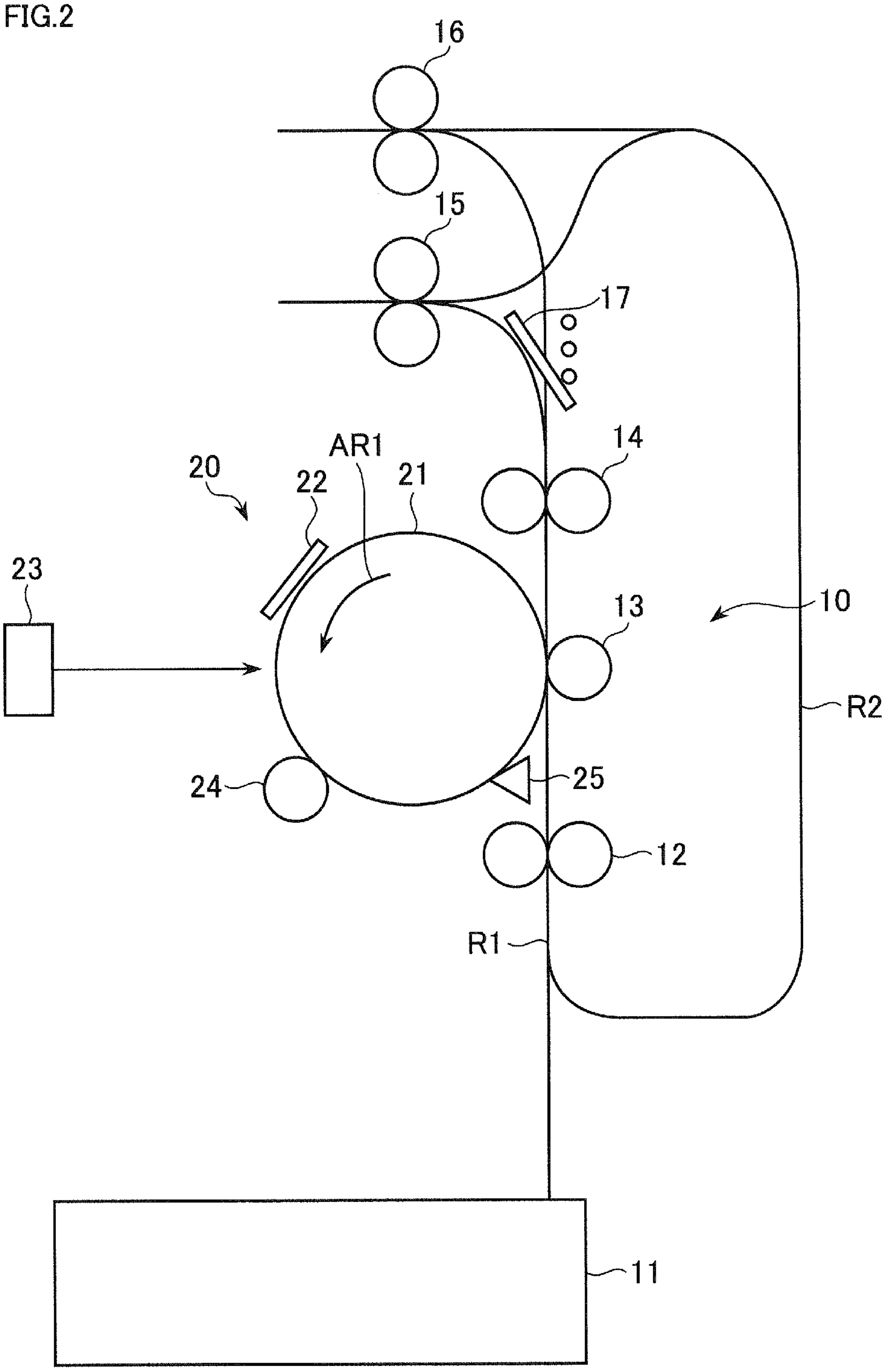
FIG. 2 is a sectional view schematically illustrating a hardware configuration of the image forming device.

FIG. 2 is a sectional view schematically illustrating a hardware configuration of the image forming device.

Referring to FIG. 2, image forming device 1 is mainly provided with a paper carrier unit 10 and a toner image forming unit 20.

Paper carrier unit 10 includes resistance rollers 12, a transfer roller 13, fuser rollers 14, discharge rollers 15, reverse rollers 16, a path switching gate 17, and the like. Resistance rollers 12, transfer roller 13, fuser rollers 14, and path switching gate 17 are disposed along a paper carrier path R1. Paper carrier path R1 is bifurcated on a downstream of path switching gate 17 (upper middle side in FIG. 2), and discharge rollers 15 and reverse rollers 16 are provided respectively along the branches of paper carrier path R1.

A paper feed unit 11 is provided at a bottom of image forming device 1, and sheets of paper (transfer paper) are loaded in paper feed unit 11. The paper in paper feed unit 11 is fed sheet by sheet when forming an image, and an end of the paper sheet fed from paper feed unit 11 reaches resistance rollers 12. With this, the transfer of the paper temporarily stops, and an inclination of the paper is corrected. When the paper again carried by resistance rollers 12 passes between a photoreceptor 21 and transfer roller 13, a toner image is transferred to one side of the paper, and the toner image is thermally fused while passing between fuser rollers 14. The paper on which the toner image is fused is carried along paper carrier path R1 toward discharge rollers 15 by path switching gate 17, and discharged through discharge rollers 15.

On the other hand, in a case of both side printing, the paper on which the toner image is fused is carried along paper carrier path R1 toward reverse rollers 16 (or discharge rollers 15) by path switching gate 17, and then along a circulating path R2 by causing the reverse rollers to rotate backward immediately before a rear end of the paper passes through a nip portion of reverse rollers 16 (or discharge rollers 15). The paper is carried to paper carrier path R1 via circulating path R2. The transfer of the paper carried to paper carrier path R1 is temporary stopped and restarted by resistance rollers 12, a toner image is transferred to the other side when the paper passes between photoreceptor 21 and transfer roller 13, and the toner image is thermally fused while passing between fuser rollers 14. The paper on which the toner images are fused is carried along paper carrier path R1 toward discharge rollers 15 by path switching gate 17, and discharged through discharge rollers 15.

Toner image forming unit 20 combines YMCK color images of four colors including yellow (Y), magenta (M), cyan (C), and black (K) as necessary, and forms a color image on the paper. Toner image forming unit 20 includes photoreceptor 21, a charging device 22, an exposure device 23, a developing device (developing roller) 24, and the like. Photoreceptor 21 is disposed at a position facing transfer roller 13. Charging device 22, exposure device 23, and developing device 24 are positioned around photoreceptor 21 in this order along a rotational direction of photoreceptor 21 indicated by an arrow AR1. Charging device 22 and developing device 24 are connected to a high-voltage power supply unit (not illustrated). Exposure device 23 includes a laser oscillator (not illustrated), a polygon mirror (not illustrated) for directing a laser beam from the laser oscillator to the photoreceptor, and a polygon motor (not illustrated) for causing the polygon mirror to rotate.

In toner image forming unit 20, photoreceptor 21 rotates in a direction indicated by an arrow A1. Charging device 22 supplies an electrical charge to photoreceptor 21 to uniformly charge photoreceptor 21. Exposure device 23 scans uniformly-charged photoreceptor 21 with a laser beam based on image data for which an instruction of image formation is received. Accordingly, an electrostatic latent image is formed on photoreceptor 21. Developing device 24 is of a rotary developing type, for example, and supplies toners in YMCK sequentially to photoreceptor 21 as necessary. Accordingly, a latent image on photoreceptor 21 is developed, and a toner image is formed on photoreceptor 21. The toner image on photoreceptor 21 is transferred to the paper by transfer roller 13.

Developing device 24 may be of a tandem developing type. In this case, it is possible to employ a configuration in which the toner images of YMCK colors developed by the developing device are overlapped with each other and transferred to an intermediate transfer belt in this state in primary transfer, and then the toner images on the intermediate transfer belt are transferred to the paper in secondary transfer. If image forming device 1 is a device that performs printing only in black and white and does not perform color printing, developing device 24 may be configured to supply only the toner of K to photoreceptor 21.

Image forming device 1 is further provided with an IDC sensor 25 disposed near photoreceptor 21.

Figure 3:
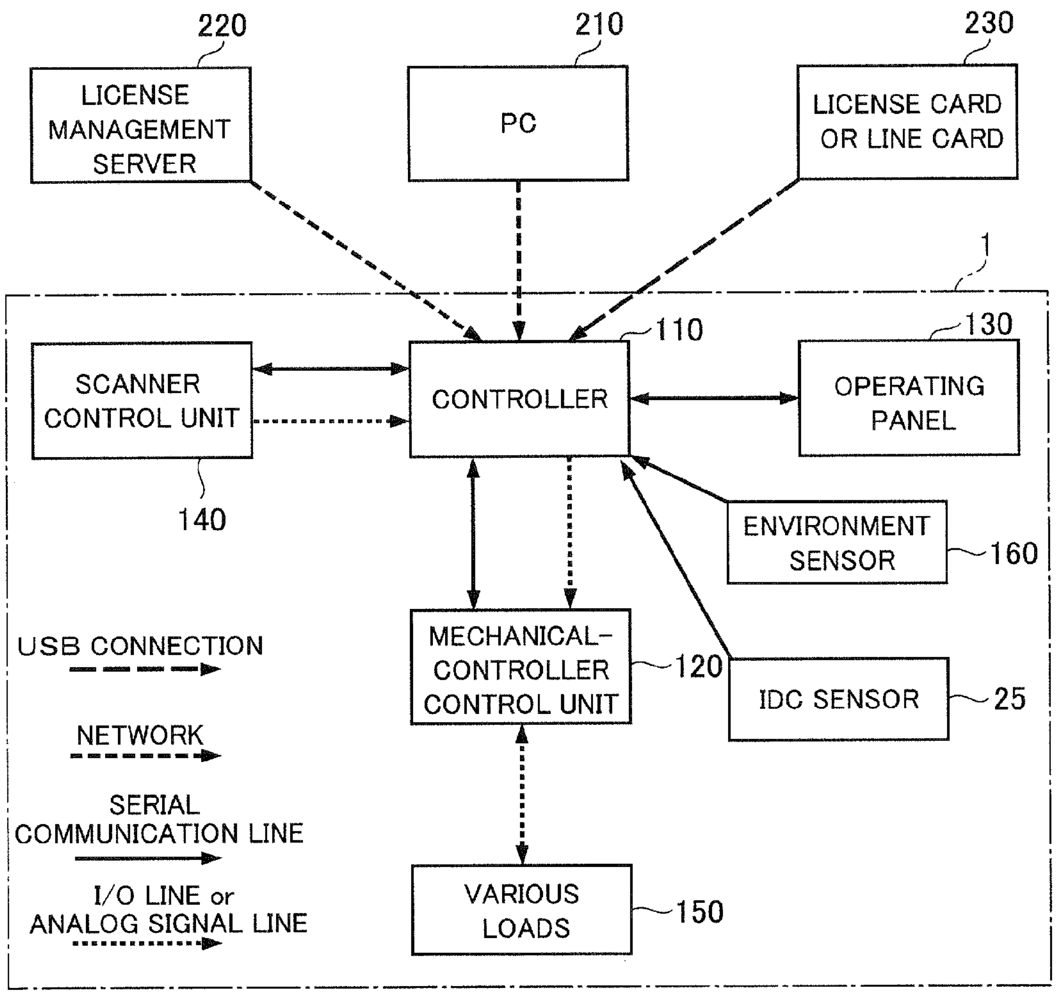
FIG. 3 is a block diagram illustrating a configuration of a control system of the image forming device.

FIG. 3 is a block diagram illustrating a configuration of a control system of the image forming device.

Referring to FIG. 3, image forming device 1 is provided with a controller 110, a mechanical-controller control unit 120, operating panel 130, a scanner control unit 140, various loads 150, and an environment sensor 160.

The blocks other than various loads 150 in image forming device 1 are respectively constituted by electric circuit boards that are independent from each other, and are each configured by a CPU (Central Processing Unit), a ROM (Read Only Memory), a RAM (Random Access Memory), a non-volatile memory, and the like.

Firmware is installed in the non-volatile memory of each of controller 110 and mechanical-controller control unit 120. Controller 110 executes various processing operations such as data processing when printing and control of operating panel 130 in accordance with the firmware. Mechanical-controller control unit 120 executes operational control of an engine unit that performs the printing operation in accordance with the firmware. Mechanical-controller control unit 120 controls various loads 150 by receiving and transmitting a load control signal from and to various loads 150 through an input-output line (I/O line) or an analog signal line.

Operating panel 130 displays various information relating to image forming device 1 by receiving and transmitting operating panel control information from and to controller 110 through a serial communication line, and receives various operations to image forming device 1 from a user through hardware keys or the like. Operating panel 130 may be provided with a touch-panel display unit, and receive operations from the user through software keys displayed in the display unit.

Scanner control unit 140 controls a scanner (not illustrated) by receiving and transmitting scanner control information from and to controller 110 through a serial communication line. Scanner control unit 140 transmits information of an image scanned by the scanner to controller 110 through an input-output line or an analog signal line.

Various loads 150 include the various rollers illustrated in FIG. 2, the polygon motor of exposure device 23, the laser oscillator for exposure, a heater for heating fuser rollers 14, a solenoid for switching the gate of path switching gate 17, the high-voltage power supply for charging, and the like.

Environment sensor 160 measures surrounding environment (e.g., temperature and humidity) in which the printer is placed. Environment sensor 160 transmits information of the measured environment to controller 110.

IDC sensor 25 reads a sampling image on photoreceptor 21 and transmits the read information to controller 110.

Image forming device 1 is able to communicate with a license card or line card 230 via a card reader connected to the port. License card or line card 230 records a program for instructing a shift to a license mode (license accepting mode) or line mode. When license card or line card 230 is connected to the port, controller 110 reads the program in license card or line card 230 and shifts a state of image forming device 1 to the license mode or line mode in accordance with the read program.

Image forming device 1 is connectable to a network via a wired LAN cable connected to the port (or wireless LAN). In a state where image forming device 1 is connected to the network, controller 110 is able to communicate with a PC (Personal Computer) 210 and a license management server 220.

The external device used in assignment of a license may be a USB dongle or the like, in place of the license card.

License management server 220 assigns a license to image forming device 1 in a predetermined situation.

An operation of image forming device 1 when performing printing in a printer mode is as follows. PC 210 transmits a print request to controller 110 through the network. The print request is described in a computer language in a PDL (page-description language) format, and is constituted by drawing information and page information (e.g., a paper size and a color mode). Upon reception of the print request, controller 110 transmits the page information to mechanical-controller control unit 120 via the serial communication line. The page information is issued for each sheet of paper. Mechanical-controller control unit 120 feeds paper from the paper feed unit sheet by sheet every time the page information is received. A paper ID (Identification) is assigned to the page information.

In the case of both side printing, mechanical-controller control unit 120 calculates the number of the sheets of paper to be transferred along the circulating path according to the paper size, and transmits image ordering information according to the circulation result to controller 110 through the serial communication line. For example, mechanical-controller control unit 120 issues pieces of image ordering information of the number of the pages (not the number of the sheets of paper) in an order of "paper ID=53 front (meaning a front side of page 53)→paper ID=54 front→paper ID=55 front→paper ID=53 back→paper ID=54 back→paper ID=55 back".

Controller 110 converts the drawing information included in the print request into bitmap image data according to the image ordering information, and records the image data in the RAM. Then, controller 110 outputs the image data to mechanical-controller control unit 120 through the input-output line or the analog signal line in accordance with a trigger signal from mechanical-controller control unit 120. Mechanical-controller control unit 120 forms an image on the sheet of paper that has been fed and discharges the sheet of paper outside the device by controlling various loads 150 based on a method described with reference to FIG. 2.

An operation of image forming device 1 in a copier mode when performing printing is as follows. Controller 110 transmits the scanner control information for scanning a document to scanner control unit 140, through the serial communication line, in accordance with the operating panel control information received from operating panel 130 through the serial communication line. The scanner control unit scans the document in accordance with the scanner control information, and outputs the image data to controller 110 through the input-output line or the analog signal line. Controller 110, while recording the image data in the RAM, creates and issues the page information to mechanical-controller control unit 120. Thereafter, the printing is performed in the same manner as in the printer mode.

[Underlying Business Model]

Next, an underlying business model according to the present embodiment will be described.

Figure 4:
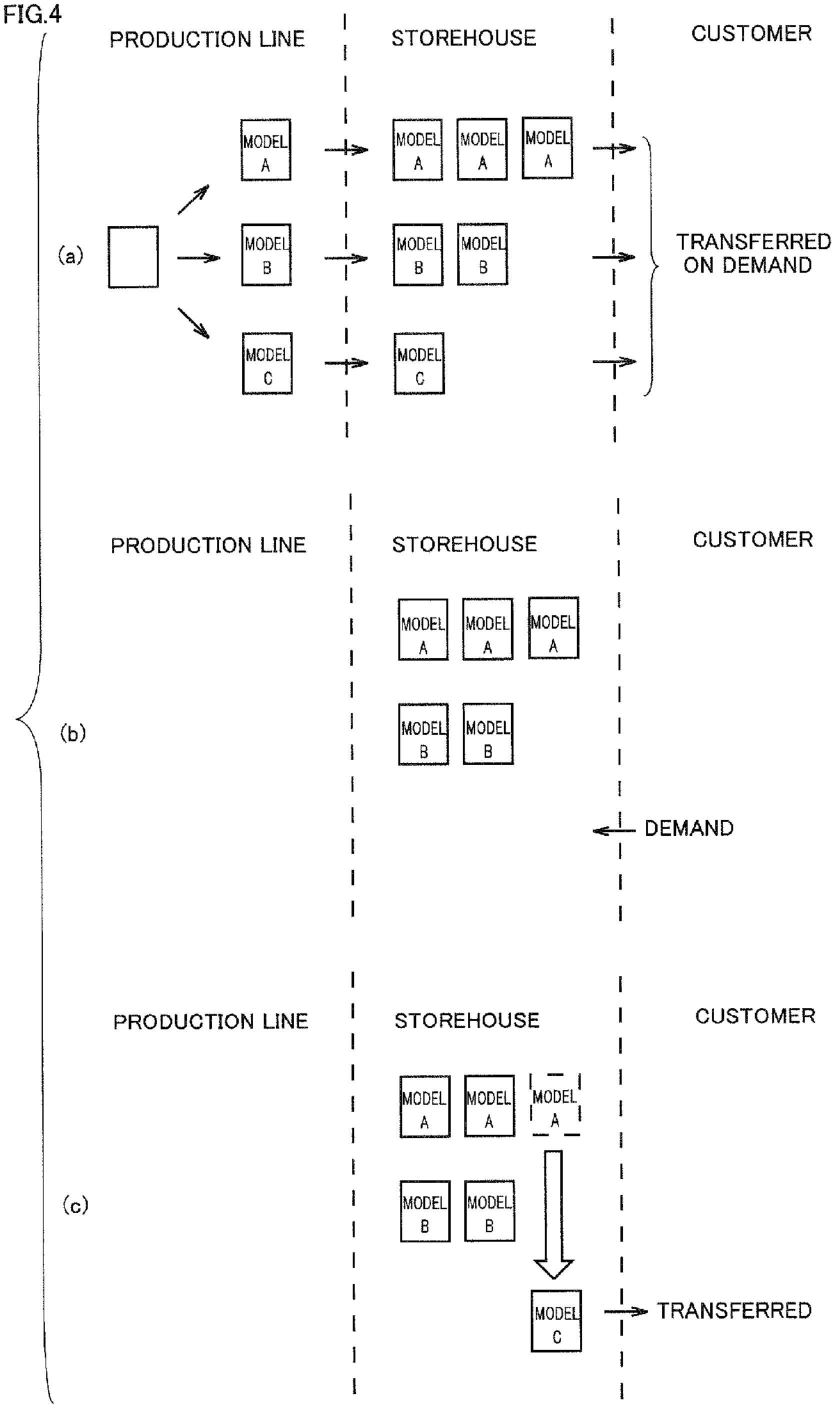
FIG. 4 is a diagram schematically illustrating an underlying business model of the one embodiment of the present invention.

FIG. 4 is a diagram schematically illustrating the underlying business model of the one embodiment of the present invention.

Referring to FIG. 4(*a*), an image forming device is assembled in the production line. When assembling the image forming device, an electronic component having firmware of a specific model installed is assembled to the image forming device. Accordingly, image forming devices having the same hardware configuration are configured as (classified into) three different models of models A-C with different productivity (printing productivity). Thereafter, the image forming devices of models A-C are transferred to the storehouse. The image forming devices stored in the storehouse are transferred (delivered) to the customer on demand.

In the present embodiment, the productivity is differentiated between different models by software control of a speed and a fusing temperature of the rollers of a paper carrier system, the polygon mirror, the photoreceptor, the developing roller, or the fuser rollers, a video data clock cycle, or the like.

It is possible to configure an image forming device to a specific model by assembling an electronic component in which no firmware is installed and then installing firmware of the specific model, instead of assembling an electronic component having firmware of the specific model installed. Further, it is possible to configure an image forming device to a specific model by installing firmware of all models A-C to one image forming device, and then accepting setting relating to firmware based on which firmware the image forming device is operated.

Referring to FIG. 4(*b*), there is a case where the stock of image forming devices of a specific model (herein, model C) in the storehouse becomes short because of such reasons that there is a greater demand from customers than predicted. In this case, as illustrated in FIG. 4(*c*), a model change (upgrade or downgrade) to the specific model is carried out by assigning a license in the storehouse or the like to an image forming device of a different model (herein, model A) stored in the storehouse, and the image forming device that have been changed to the specific model is transferred to the customer. Accordingly, it is possible to shorten the time for delivery as compared to a case where a new image forming device of model C is produced in the production line.

FIG. 5 is a diagram schematically illustrating a relation between the models and the firmware of the image forming device.

Referring to FIG. 5, it is assumed that image forming devices of models A-C having the same hardware configuration are provided using the above business model, for example. Model A has productivity of 36 ppm (Page Per Minute) and resolution of 1200 dpi. Model B has productivity of 28 ppm and resolution of 1200 dpi. Model C has productivity of 22 ppm and resolution of 600 dpi. System speeds achieving the productivity of models A-C are respectively indicated as V1, V2, and V3. In this case, firmware A realizing a system speed V1 is installed to an image forming device to be model A, firmware B realizing a system speed V2 is installed to an image forming device to be model B, and firmware C realizing a system speed V3 is installed to an image forming device to be model C.

Firmware A-C basically have the same software configuration, but are different from each other in constant numbers relating to the system speed or constant numbers relating to image quality. Firmware A-C may have completely different software configurations.

[Method of Model Change]

Next, a method of changing the model of the image forming device will be described.

When the power of the image forming device is turned on while the license card and the wired LAN cable are connected to the image forming device, the image forming device automatically shifts to the license mode, and communicates with license management server 220 via the network. The image forming device may additionally request input of a password in order to shift to the license mode.

When changing the mode in the storehouse, a part of the image forming device remains packed. Components such as a lifting plate within the scanner or a paper cassette, and the developing device are locked for protection, and the rotation of the motor is also locked. Therefore, in the license mode, the controller and the mechanical-controller control unit control the various loads so that the loads in an output system such as the motor and the heater are not activated at all.

Figure 6:
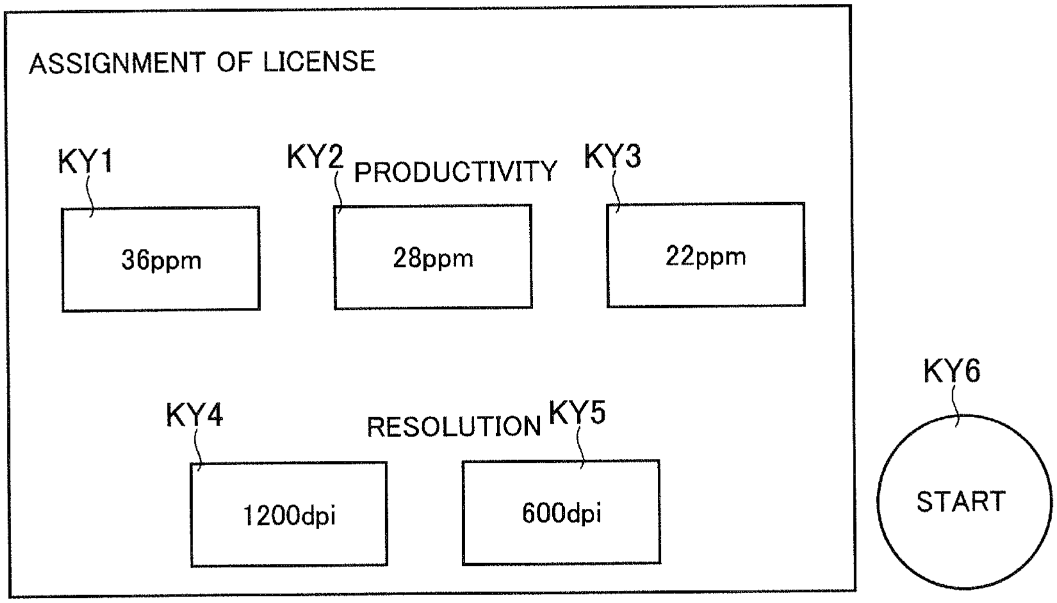
FIG. 6 is a diagram schematically illustrating a selection screen displayed in an operating panel.

Upon shifting to the license mode, the image forming device displays a selection screen illustrated in FIG. 6 in operating panel 130.

FIG. 6 is a diagram schematically illustrating the selection screen displayed in the operating panel.

Referring to FIG. 6, operating panel 130 displays the selection screen including productivity items of a key KY1 of "36 ppm", a key KY2 of "28 ppm", and a key KY3 of "22 ppm", and image quality (resolution) items of a key KY4 of "1200 dpi" and a key KY5 of "600 dpi". Keys KY1 to KY5 are software keys. The operator in the storehouse sets the productivity and the image quality by pressing a key of a desired grade for each of the productivity and the image quality, and then pressing a key KY6 (start key) which is a hardware key of operating panel 130.

Upon accepting the setting of the productivity and the image quality, the image forming device transmits to a license management server the productivity and the image quality for which the setting has been accepted, along with a serial number of the image forming device. The license management server assigns a license to the image forming device based on the serial number, after confirming that the image forming device is qualified to be assigned with a license (not double-licensed).

Upon assignment of the license, each of the controller, the mechanical-controller control unit, and the scanner control unit of the image forming device changes the constant number relating to the productivity (system speed) and the constant number relating to the image quality in the firmware recorded in the non-volatile memory based on information of the productivity and the image quality for which the setting has been accepted.

It is possible to configure such that the image forming device previously records programs in association with model codes of all of the settable models, and upon assignment of a license, each of the controller, the mechanical-controller control unit, and the scanner control unit controls based on a program of a model code corresponding to the license.

Depending on the type of license to be assigned, it is possible to change the model of the image forming device from a low-end model to a high-end model, or from a high-end model to a low-end model. Further, depending on the type of license to be assigned, it is possible to add or remove functions such as a scanner to or from the image forming device, or change the image forming device configured as a dedicated black and white printing machine to a color printing machine.

[Process from Manufacturing to Delivery to Customer]

Next, a process from manufacturing of the image forming device to delivery of the image forming device to the customer in the present embodiment will be described.

Figure 7:
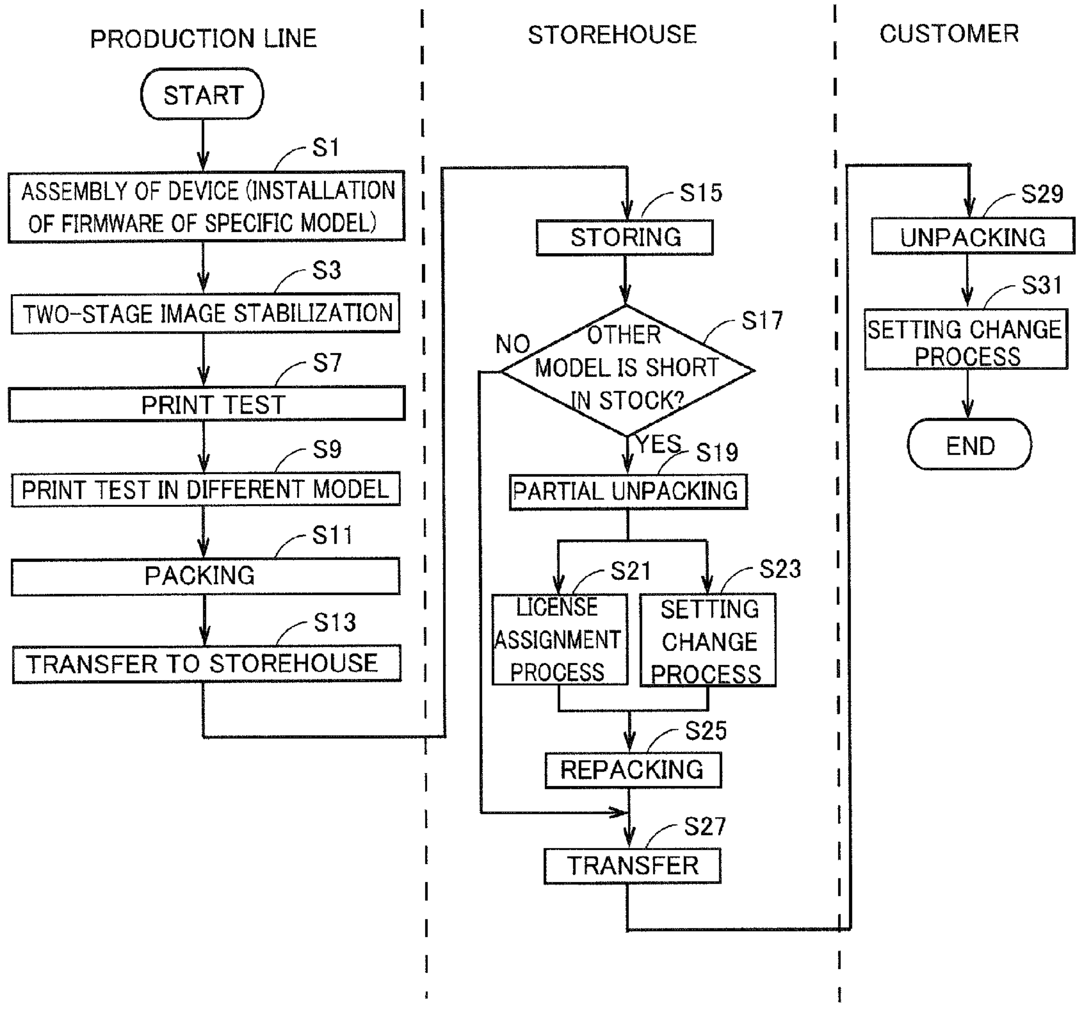
FIG. 7 is a flowchart schematically showing a process from manufacturing of the image forming device to delivery of the image forming device to a customer in the one embodiment of the present invention.

FIG. 7 is a flowchart schematically showing the process from manufacturing of the image forming device to delivery of the image forming device to the customer in the one embodiment of the present invention.

Referring to FIG. 7, a manufacturer at the production line assembles the image forming device (S1). When assembling the image forming device, an electronic component having firmware of a specific model (firmware having a constant number of a specific system speed) installed is assembled to the image forming device. Accordingly, the model of the image forming device is set to the specific model. Then, in order to optimize the various parameters for the set model, the manufacturer operates the image forming device and causes the image forming device to perform two-stage image stabilization (S3). Subsequently, the manufacturer performs a print test by actually printing with the image forming device (S7). Thereafter, the manufacturer connects a line card to the image forming device. Accordingly, the image forming device shifts to the line mode, and the manufacturer is able to freely change the model of the image forming device. The manufacturer changes the set model to a different model (switches the system speed to a different system speed), and performs a print test in the same manner as in step S7 (S9). When the image forming device passes the print test in steps S7 and S9, the manufacturer packs the image forming device (S11) after changing the set model to the original model (specific model), and the packed image forming device is transferred to the storehouse (S13).

The image forming device transferred to the storehouse is stored until it is delivered to the customer (S15). When the image forming device is stored in the storehouse, the operator in the storehouse determines whether or not a model of image forming devices other than the model of this image forming device is short in stock in the storehouse (S17).

In step S17, if it is determined that the different model is not short in stock (NO in S17), the operator in the storehouse transfers the image forming device to the customer on demand (S27).

In step S17, if it is determined that the different model is short in stock (YES in S17), the operator in the storehouse unpacks only a part of the image forming device (S19), and turns on the image forming device while a license card and a LAN cable are connected to the image forming device. Accordingly, controller 110 of the image forming device automatically executes a license assignment process (S21) and a setting change process (S23). As a result, the image forming device is changed to the model that is short in stock, and the system speed is switched. Details of the license assignment process and the setting change process will be described later. Then, the operator in the storehouse repacks the image forming device (S25), and transfers the image forming device to the customer on demand (S27).

In the state where the image forming device is packed, various driving members of the image forming device are fixed so as not to move casually. Accordingly, if the image forming device as a whole is unpacked, an extended time period is adversely required for unpacking and repacking. Therefore, in step S19, only a part of the image forming device minimally required for the license assignment process is unpacked in order to reduce the time required for unpacking and repacking.

The serviceman completely unpacks the image forming device at the customer's place (S29), and turns on the image forming device. With this, controller 110 of the image forming device executes the setting change process (S31). Through the above steps, the delivery to the customer is completed.

Figure 8:
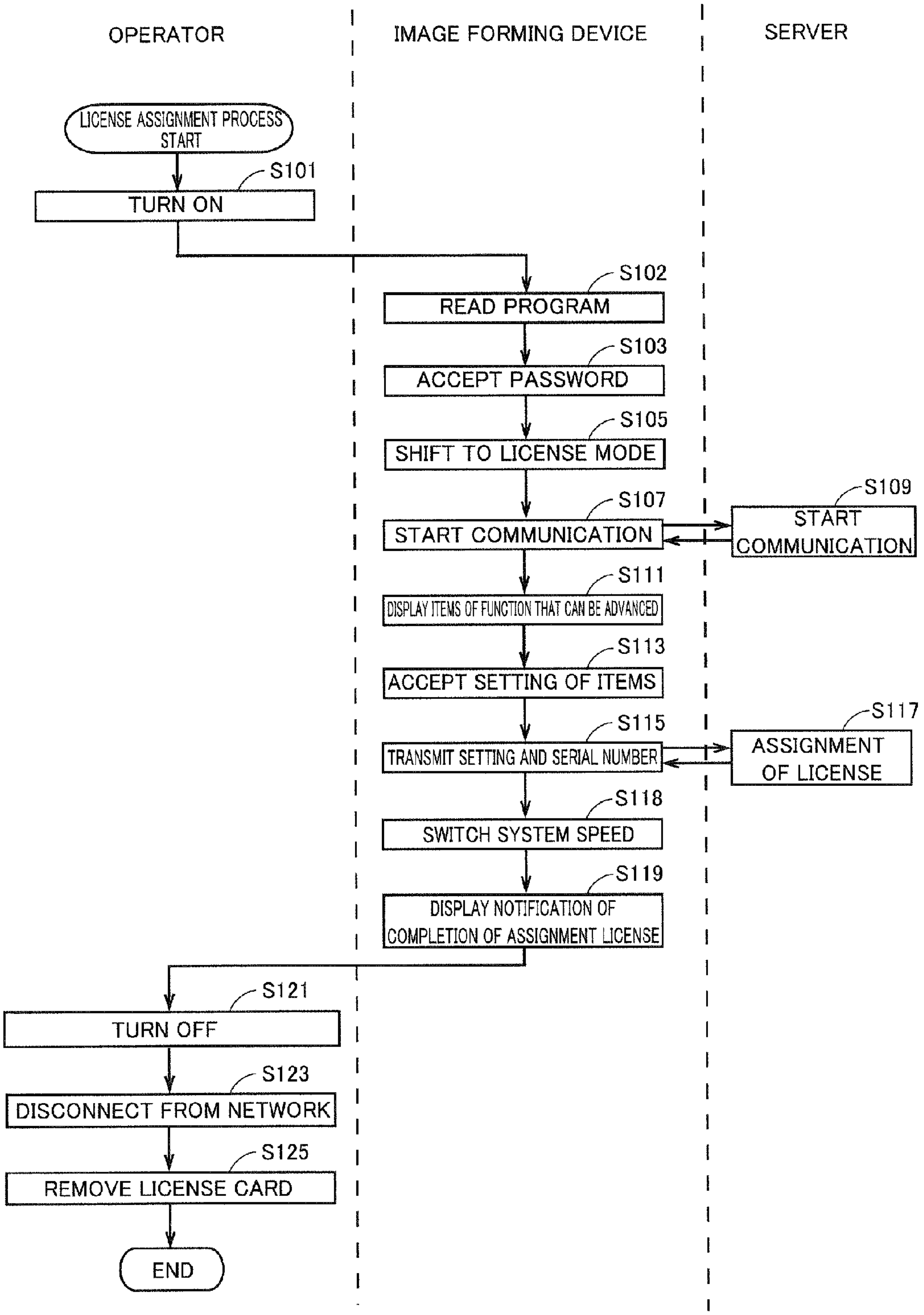
FIG. 8 is a flowchart of a license assignment process in step S21 in FIG. 7.

FIG. 8 is a flowchart of the license assignment process in step S21 in FIG. 7.

Referring to FIG. 8, when the power of the image forming device is turned on by the operator in the storehouse while the license card and the LAN cable are connected to the image forming device (S101), controller 110 reads a program recorded in the license card (S102). Next, controller 110 displays in the operating panel a screen through which a password is accepted, and accepts input of the password from the operator (S103). If the inputted password is correct, controller 110 shifts to the license mode (S105), and starts communication with the license management server via the network (S107 and S109).

Subsequently, controller 110 displays items of the functions that can be advanced (the selection screen illustrated in FIG. 6) (S111), and accepts setting of the items (S113). Upon accepting the setting of the items, controller 110 transmits the accepted setting and the serial number of the image forming device to the license management server (S115). The license management server confirms qualification of the image forming device based on the serial number, and assigns a license to the image forming device, and the image forming device receives the assignment of the license (S117). Upon reception of the assignment of the license, controller 110 switches the system speed by overwriting the constant number relating to the system speed in the firmware in accordance with contents of the assigned license (S118). Upon completing the switching of the system speed (upon completion of model change), controller 110 displays a screen notifying the completion of the assignment of the license in operating panel 130 (S119).

When the message is displayed in operating panel 130, the operator in the storehouse turns off the power of the image forming device (S121), disconnects the image forming device from the network (S123), removes the license card from the image forming device (S125), and returns.

Figure 9:
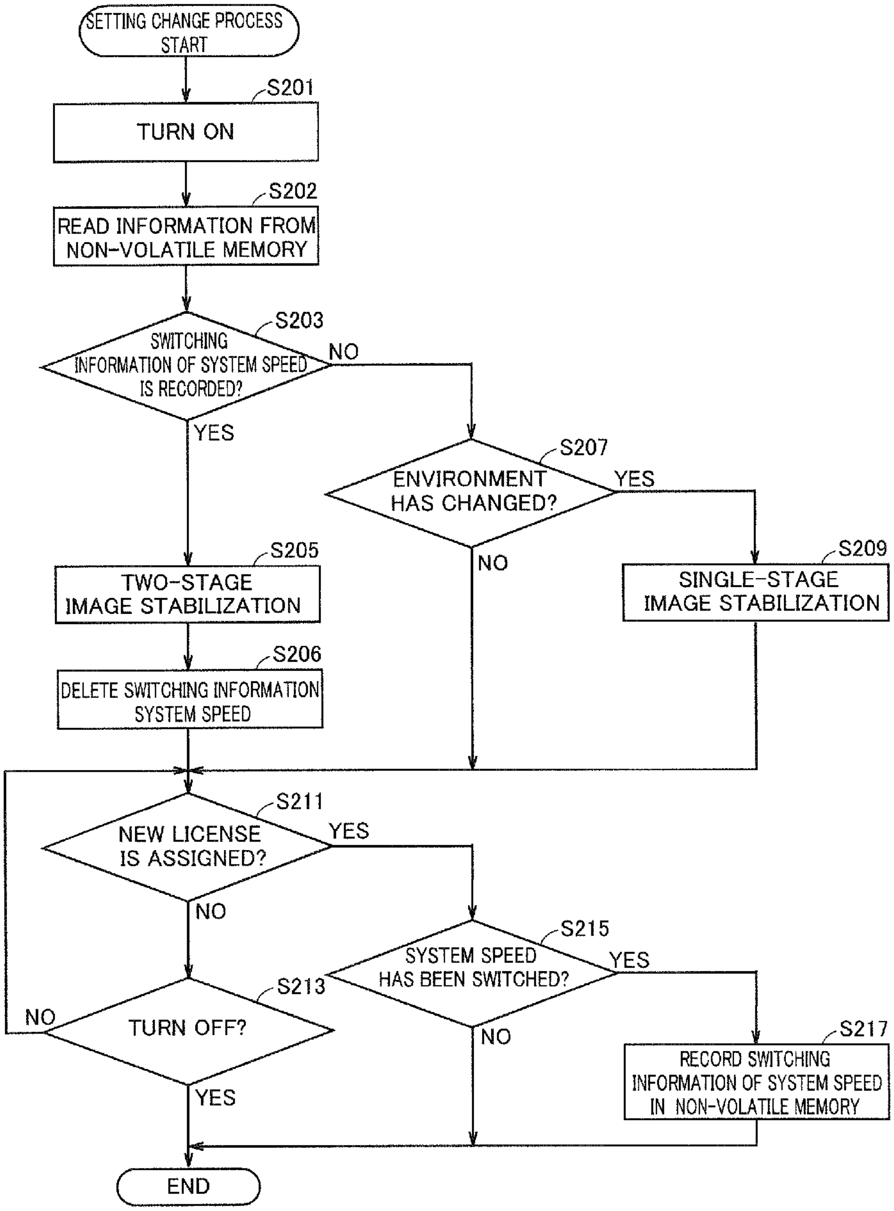
FIG. 9 is a flowchart of a setting change process in steps S23 and S31 in FIG. 7.

FIG. 9 is a flowchart of the setting change process in steps S23 and S31 in FIG. 7.

Referring to FIG. 9, when the power of the image forming device is turned on by the operator in the storehouse (S201), controller 110 reads information from the non-volatile memory of controller 110 (S202), and determines whether or not the non-volatile memory records switching information of the system speed (S203).

The switching information of the system is information indicating that the system speed has been switched. If the non-volatile memory records this information, the parameters relating to a current image formation process are set under a system speed different from the current system speed. The switching information of the system may include information relating to an amount of change in the system speed. The amount of change in the system speed corresponds to a difference between system speeds before and after switching.

In step S203, if it is determined that the switching information of the system speed is recorded (YES in S203), controller 110 performs two-stage image stabilization (S205). Then, controller 110 deletes the switching information of the system speed from the non-volatile memory (S206), and moves to a process in step S211.

In step S203, if it is determined that the switching information of the system speed is not recorded (NO in S203), controller 110 determines, based on measurement results by the environment sensor, whether or not an environment in which the image forming device is placed has changed from an environment when the power of the image forming device is turned on the last time (S207).

In step S207, if it is determined that the environment has not changed (NO in S207), image stabilization is not necessary, and controller 110 moves to a process in step S211. On the other hand, in step S207, if it is determined that the environment has changed (YES in S207), controller 110 performs single-stage image stabilization (S209), and moves to the process in step S211.

In step S211, controller 110 determines whether or not a new license is assigned to the image forming device (S211).

In step S211, if it is determined that a new license is not assigned (NO in S211), controller 110 determines whether or not the power is turned off (S213).

In step S213, if it is determined that the power is turned off (YES in S213), controller 110 returns. On the other hand, in step S213, if it is determined that the power is not turned off (NO in S213), controller 110 moves to the process in step S211.

In step S211, if it is determined that a license is assigned (YES in S211), controller 110 determines whether or not the system speed has been switched by the assignment of the license (S215).

In step S215, if it is determined that the system speed has not been switched (NO in S215), controller 110 returns. On the other hand, in step S215, if it is determined that the system speed has been switched (YES in S215), controller 110 records the switching information of the system speed in the non-volatile memory (S217), and returns.

[Image Stabilization]

Next, image stabilization in the present embodiment will be described.

The image stabilization is a process for determining (optimizing) setting values of parameters relating to the image formation (hereinafter simply referred to as parameters). The parameters relating to the image formation include a value of an alternating voltage or a direct voltage applied to the charging device, a value of an alternating or a direct developing bias, a gamma correction amount, and a light intensity of a laser beam for forming an electrostatic latent image. In the image stabilization, at least one of the setting values of the parameters may be determined, or a setting value of a parameter other than the above may be determined. Here, the image stabilization in which the light intensity of the laser beam is optimized is described. It is assumed that the values that the parameter can take are in a range from 0 to 100.

Figure 10:
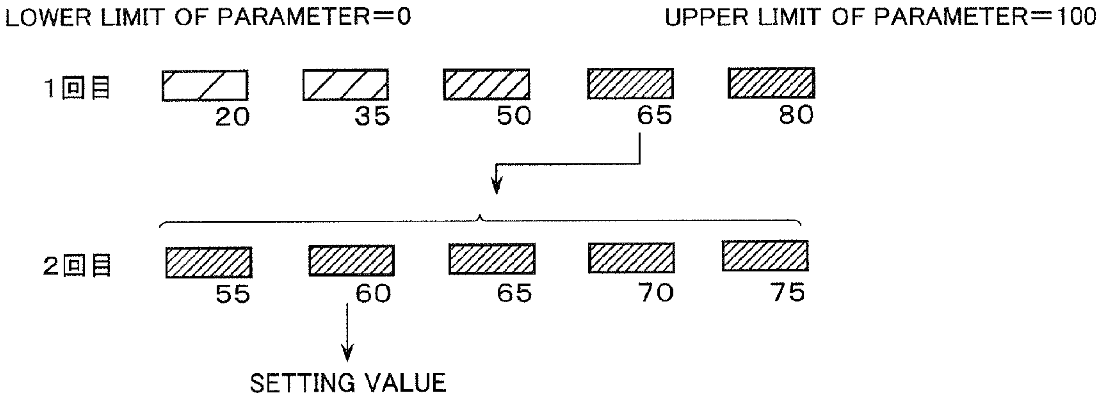
FIG. 10 is a diagram for describing two-stage image stabilization.
Figure 11:
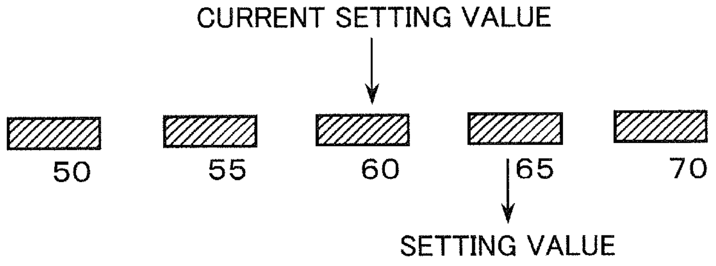
FIG. 11 is a diagram for describing single-stage image stabilization.

FIG. 10 is a diagram for describing the two-stage image stabilization. In FIGS. 10 and 11, differences in image density are represented by differences in hatching.

Referring to FIG. 10, the two-stage image stabilization takes a widest adjustable range of the parameters (0-100), and is used when searching optimal setting values for the parameters for the current printing within this adjustable range.

Specifically, the controller selects, as a first image stabilization, five light intensities (sampling output values) of the laser beam in a first adjustable range from 0 to 100 (here, values of 20, 35, 50, 65, and 80 are selected). It is preferable that intervals between the selected values (here, the interval is 15) be equal to each other. Next, the controller radiates laser beams respectively of the selected intensities, and forms sampling images on an image carrier. By forming the sampling images with varying light intensities of the laser beams, differences such as density differences are produced between the sampling images. Then, the controller determines a provisional setting value of the light intensity of a laser beam optimal for the current printing (here, an approximate setting value of 65) by evaluating the sampling images read by the IDC sensor.

A second image stabilization is performed in order to improve accuracy of the provisional setting value of the light intensity of the laser beam determined in the first image stabilization. As the second image stabilization, five light intensities of the laser beam are selected (here, values of 55, 60, 65, 70, and 75 are selected) in a second adjustable range narrower (finer) than the first adjustable range and including the provisional setting value. It is preferable that intervals between the selected values (here, the interval is 5) be equal to each other and narrower than the interval in the first image stabilization. It is also preferable that the second adjustable range be selected so as to take the provisional setting value as a median value. Next, the controller radiates laser beams respectively of the selected intensities, and forms sampling images on the image carrier. Then, the controller determines a setting value of the light intensity of a laser beam optimal for the current printing (here, a setting value of 60) by evaluating the sampling images read by the IDC sensor, and records the value in the non-volatile memory or the like.

FIG. 11 is a diagram for describing the single-stage image stabilization.

Referring to FIG. 11, in the single-stage image stabilization, five light intensities of the laser beam are selected (here, values of 50, 55, 60, 65, and 70 are selected) in a third adjustable range narrower than the first adjustable range and including a current setting value (a setting value that has been set). It is preferable that intervals between the selected values (here, the interval is 5) be equal to each other and narrower than the interval in the first image stabilization in the two-stage image stabilization. The third adjustable range may be as large as the second adjustable range, and preferably selected so as to take the current setting value as a median value. Next, the controller forms sampling images on the image carrier respectively by the selected output values. Then, the controller determines a setting value of the light intensity of a laser beam optimal for the current printing (here, a setting value of 65) by evaluating the sampling images read by the IDC sensor, and records the value in the non-volatile memory or the like.

While the single-stage image stabilization is not able to accommodate a case where the setting values of the parameters change largely, the time required for the image stabilization is advantageously shorter than that of the two-stage image stabilization.

Figure 12:
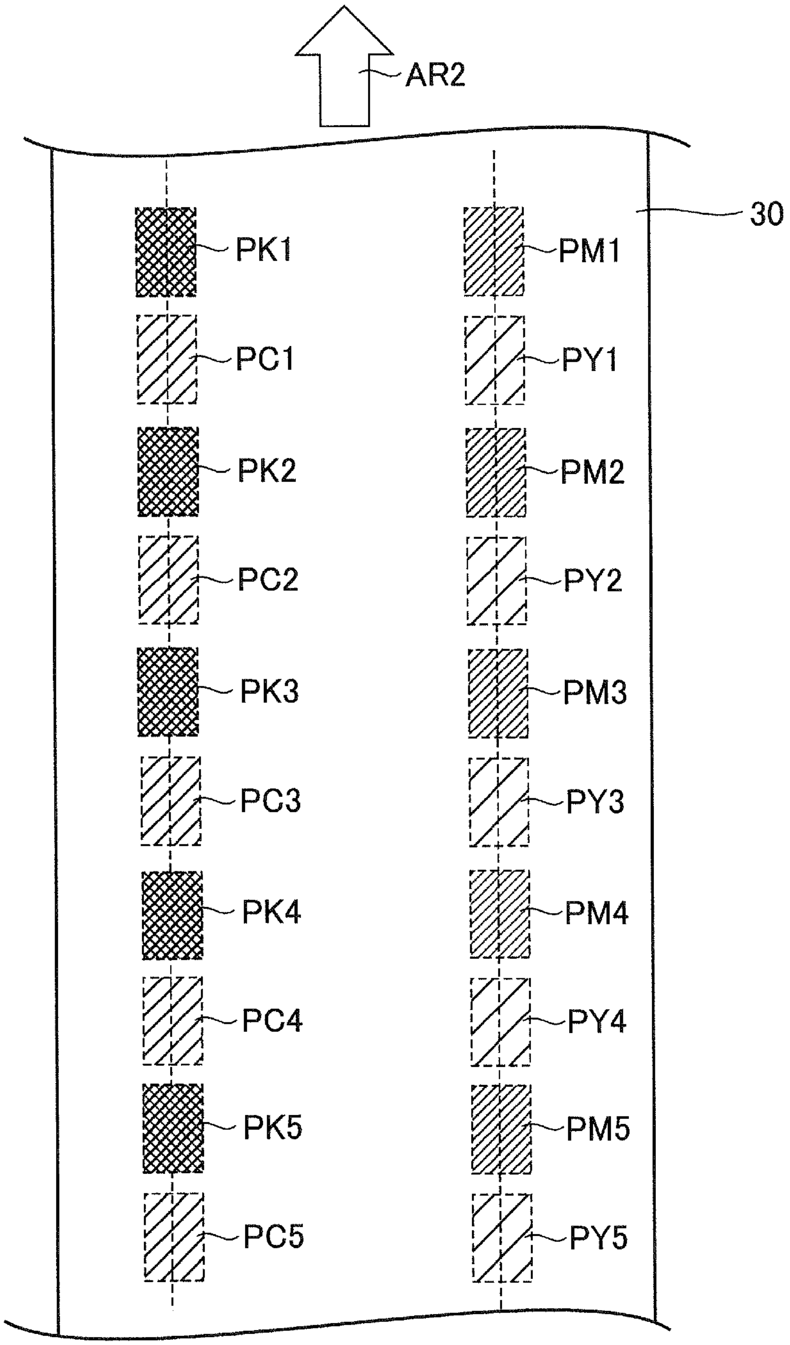
FIG. 12 is a plan view schematically illustrating a sampling pattern formed in the image stabilization.

FIG. 12 is a plan view schematically illustrating a sampling pattern formed in the image stabilization.

Referring to FIG. 12, an image carrier 30 constituted by the photoreceptor and the intermediate transfer belt rotates in a direction indicated by an arrow AR2. Being controlled by the controller, the mechanical-controller control unit forms sampling images on image carrier 30 while changing the light intensity of the laser beam for each of the colors that is used. Sampling images PK1-PK5 of black (K) and sampling images PC1-PC5 of cyan (C) are alternately formed on the left side of image carrier 30 in FIG. 12, and sampling images PM1-PM5 of magenta (M) and sampling images PY1-PY5 of yellow (Y) are alternately formed on the right side of image carrier 30 in FIG. 12. Sampling images PK1-PK5 are respectively formed by the laser beams of the light intensities that are different from each other. Sampling images PC1-PC5 are respectively formed by the laser beams of the light intensities that are different from each other. Sampling images PM1-PM5 are respectively formed by the laser beams of the light intensities that are different from each other. Sampling images PY1-PY5 are respectively formed by the laser beams of the light intensities that are different from each other. Sampling images PK1-PK5 and corresponding sampling images PM1-PM5 are formed on image carrier 30 at the same timing, and sampling images PC1-PC5 and corresponding sampling images PY1-PY5 are formed on image carrier 30 at the same timing.

The image stabilization in which setting values for the voltage applied to the charging device (a high-voltage output when charging), the developing bias, or the gamma correction amount are determined as the parameters is performed in the same manner as the optimization of the light intensity of the laser beam.

[First Modified Example]

Next, a first modified example of the setting change process according to the present embodiment will be described. This modified example describes a case where the setting change process is different from the process shown in FIG. 9. In this modified example, the controller previously records a first and a second threshold value (the first threshold value>the second threshold value) in the non-volatile memory or the like. When the non-volatile memory records the switching information of the system speed, the controller performs the two-stage image stabilization if the amount of change in the system speed is greater than the first threshold value; the controller performs the single-stage image stabilization if the amount of change in the system speed is equal to or greater than the second threshold value and smaller than the first threshold value; and the controller does not perform either two-stage image stabilization or single-stage image stabilization if the amount of change in the system speed is smaller than the second threshold value. It is preferable that the first threshold value be a threshold value of the amount of change in the system speed for which the setting value is required to be determined in a range wider than the adjustable range in the single-stage image stabilization by the switching of the system speed.

Figure 13:
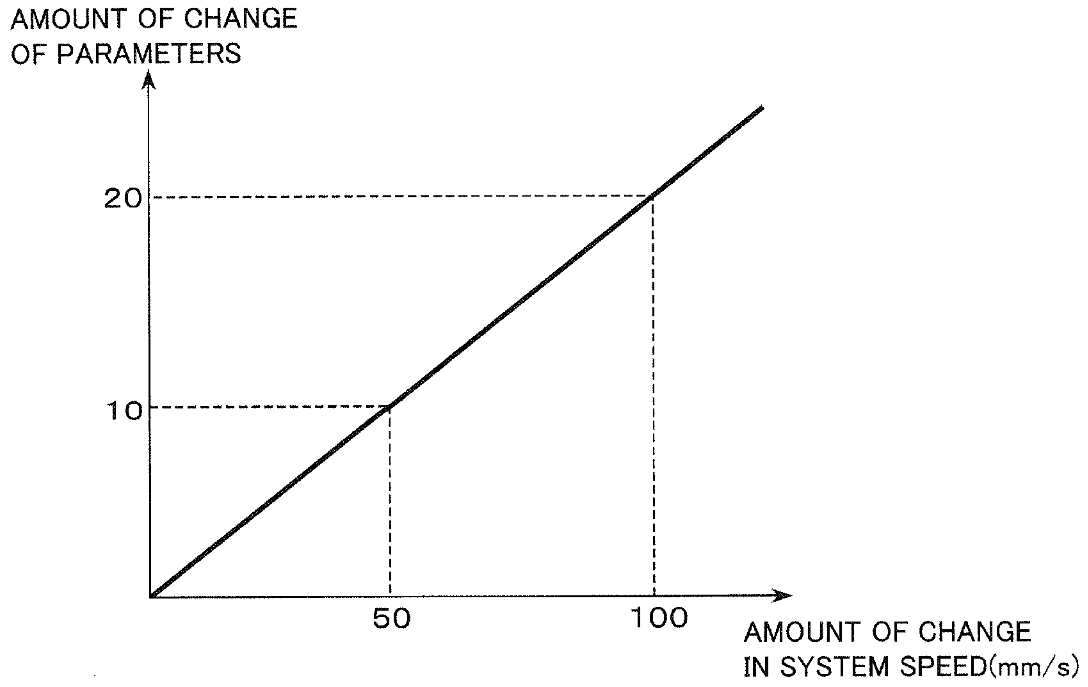
FIG. 13 is a diagram schematically illustrating a relation between an amount of change in system speed and an amount of change of parameters relating to image formation.

FIG. 13 is a diagram schematically illustrating a relation between the amount of change in the system speed and the amount of change of the parameters relating to the image formation. FIG. 13 shows a printing speed as the system speed, and a voltage applied to the charging device as the parameter.

Referring to FIG. 13, generally, a relation between the amount of change in the system speed and the amount of change in the parameter is close to a proportional relation, and as the amount of change in the system speed increases, the amount of change in the parameter also increases. For each of other parameters such as the developing bias, the gamma correction amount, and the light intensity of the laser beam forming an electrostatic latent image, the same relation as shown in FIG. 13 is established with the amount of change in the system speed. Therefore, it is possible to use the two-stage image stabilization or the single-stage image stabilization depending on the amount of change in the system speed. For example, if the amount of change in the system speed is equal to or greater than a threshold value of 100 (mm/s), the amount of change in the parameter is predicted to be equal to or greater than 20, and therefore the controller performs the two-stage image stabilization. If the amount of change in the system speed is equal to or greater than 50 (mm/s) and smaller than 100 (mm/s), the amount of change in the parameter is predicted to be equal to or greater than 10 and smaller than 20, and therefore the controller performs the single-stage image stabilization. If the amount of change in the system speed is smaller than 50 (mm/s), the amount of change in the parameter is predicted to be smaller than 10, and therefore the controller does not perform either two-stage image stabilization or single-stage image stabilization.

Figure 14:
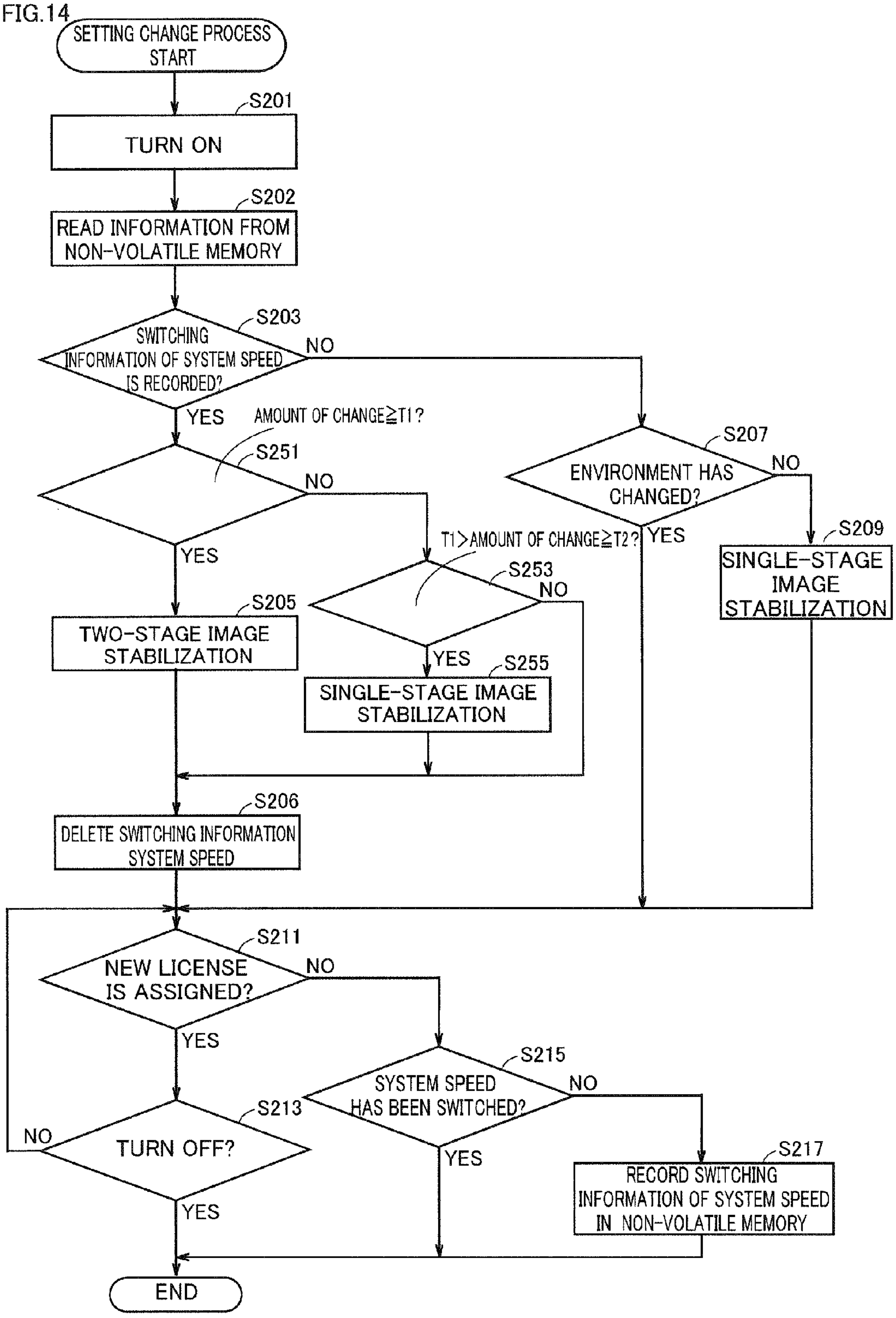
FIG. 14 is a flowchart of a setting change process in a first modified example.

FIG. 14 is a flowchart of the setting change process in the first modified example. This flowchart corresponds to a flowchart of the setting change process in steps S23 and S31 in FIG. 7.

Referring to FIG. 14, in the setting change process according to this modified example, the process executed when it is determined in step S203 that the switching information of the system speed is recorded (YES in S203) is different from that in the setting change process shown in FIG. 9.

Specifically, in step S203, if it is determined that the switching information of the system speed is recorded (YES in S203), controller 110 determines whether or not the amount of change in the system speed is equal to or greater than a threshold value T1 (S251).

In step S251, if it is determined that the amount of change in the system speed is equal to or greater than threshold value T1 (YES in S251), controller 110 performs the two-stage image stabilization since the amount of change in the system speed is large (S205), and moves to a process in step S206. In and after step S206, controller 110 performs the same process as in the setting change process shown in FIG. 9.

In step S251, if it is determined that the amount of change in the system speed is smaller than threshold value T1 (NO in S251), controller 110 determines whether or not the amount of change in the system speed is equal to or greater than a threshold value T2 and smaller than threshold value T1 (S253). Threshold values T1 and T2 are in a relation of threshold value T1>threshold value T2.

In step S253, if it is determined that the amount of change in the system speed is equal to or greater than threshold value T2 and smaller than threshold value T1 (YES in S253), controller 110 performs the single-stage image stabilization since the amount of change in the system speed is intermediate (S255), and moves to a process in step S206.

In step S253, if it is determined that the amount of change in the system speed is smaller than threshold value T2 (YES in S253), controller 110 does not perform either two-stage image stabilization or single-stage image stabilization since the amount of change in the system speed is small, and moves to a process in step S206.

According to this modified example, by using the two-stage image stabilization and the single-stage image stabilization depending on the amount of change in the system speed, it is possible to reduce the time required for the image stabilization when the amount of change in the system is small.

[Second Modified Example]

Next, a second modified example according to the present embodiment will be described. This modified example describes a case where a configuration of the image forming device is different from that shown in FIG. 3.

Figure 15:
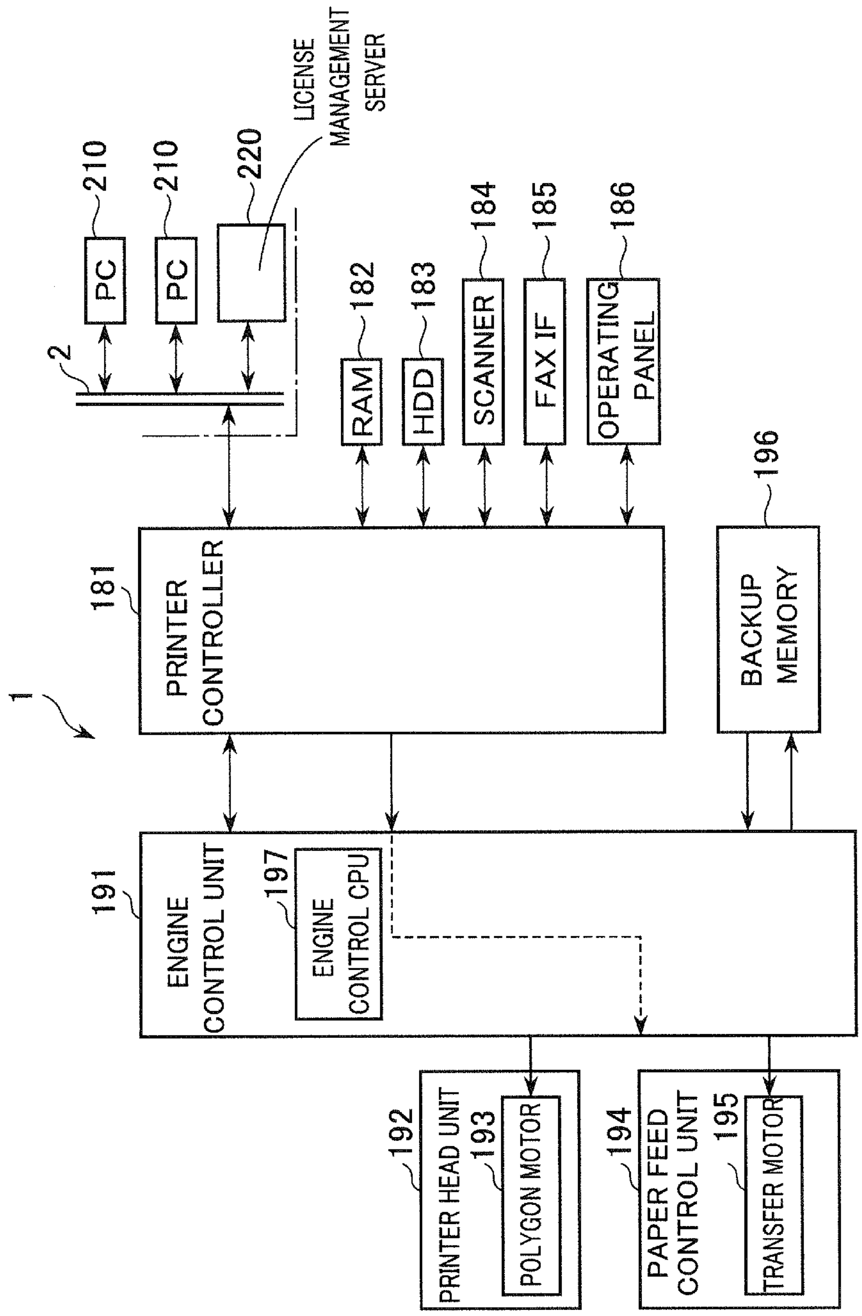
FIG. 15 is a block diagram illustrating a configuration of the control system of the image forming device according to a second modified example.

FIG. 15 is a block diagram illustrating the configuration of the control system of the image forming device according to the second modified example.

Referring to FIG. 15, image forming device 1 includes a printer controller 181, a RAM 182, an HDD (Hard Disk Drive) 183, a scanner 184, a facsimile interface 185, an operating panel 186, an engine control unit 191, a printer head unit 192, a paper feed control unit 194, and a backup memory 196.

Engine control unit 191 controls printer head unit 192 and paper feed control unit 194. Printer head unit 192 includes a polygon motor 193, and performs polygon motor control such as activation, deactivation, and monitoring during rotation of polygon motor 193. Paper feed control unit 194 includes a transfer motor 195, and performs transfer motor control such as activation, deactivation, and monitoring during rotation of transfer motor 195.

Printer controller 181 controls RAM 182, HDD 183, scanner 184, facsimile interface 185, and operating panel 186. Printer controller 181 is able to perform serial communication with engine control unit 191, and supplies the image data to engine control unit 191 via an image bus. Further, printer controller 181 transmits and receives data to and from PC 210 or license management server 220 via a LAN line 2.

RAM 182 and HDD 183 are recording media, and RAM 182 is superior to HDD 183 in terms of a transfer rate. Although HDD 183 is inferior to RAM 182 in terms of a transfer rate, HDD 183 tends to be more advantageous over RAM 182 in terms of a storage capacity. Firmware of image forming device 1 is recorded in HDD 183, for example. Scanner 184 reads a document and forms image data. Facsimile interface 185 transmits and receives the image data using the facsimile machine. Operating panel 186 includes a touch panel and a pressing button key as hardware. Operating panel 186 displays a screen to the user, and accepts an input operation from a user. The print mode is set based on an input through the operating panel.

When the user sets the print mode through the operating panel, a print preparation command is transmitted from printer controller 181 to engine control unit 191. Engine control unit 191 includes an engine control CPU 197, and executes a print preparation operation by engine control CPU 197. During the print preparation operation, engine control unit 191 changes the speed of polygon motor 193 or transfer motor 195 as necessary. Engine control unit 191 writes information to backup memory 196 and reads information from backup memory 196 as necessary.

[Effects of Embodiment]

According to the embodiment described above, it is possible to provide an image forming device capable of improving the setup efficiency at the customer's place. Further, according to the present invention, it is possible to provide an image forming device capable of preventing the image stabilization from failing to be performed.

According to the embodiment described above, the image forming device automatically performs the two-stage image stabilization if the system speed has been changed due to assignment of a license, and the image forming device automatically performs the single-stage image stabilization if the system speed has not been changed. Accordingly, the serviceman who carries out the setup of the image forming device at the customer's place is not required to cause all the image forming devices to perform the two-stage image stabilization. As a result, it is possible to improve the setup efficiency at the customer's place. In addition, since the image forming device automatically performs the two-stage image stabilization when the system speed of the image forming device has been changed due to the assignment of the license, it is possible to prevent the serviceman from forgetting and failing to perform the image stabilization.

[Others]

If the system speed is not changed in the flowcharts shown in FIGS. 9 and 14, the determination on the environmental change (S207) may not be performed, and the image stabilization may not be performed without exception.

The processes in the embodiment described above may be performed using software or a hardware circuit. Further, it is possible to provide a program executing the processes in the embodiment described above, or the program may be provided for the user by recording the program in a recording medium such as a CD-ROM, a flexible disk, a hard disk, a ROM, a RAM, or a memory card. The program is executed by a computer such as a CPU. Alternatively, the program may be provided by downloading to a device through a communication line such as the Internet.

Although the present invention has been described and illustrated in detail, it is clearly understood that the same is by way of illustration and example only and is not to be taken by way of limitation, the scope of the present invention being limited only by the terms of the appended claims.

What is claimed is:

1. An image forming device comprising:

a license accepting unit for accepting assignment of a license;

a switching unit for switching a system speed when the assignment of the license has been accepted by said license accepting unit;

a storing unit for storing information indicating that the system speed has been switched when the system speed has been switched by said switching unit;

a switch determination unit for determining whether or not the information indicating that the system speed has been switched is stored in said storing unit;

a first image stabilization unit for performing two-stage image stabilization when it is determined by said switch determination unit that the information is stored, the two-stage image stabilization being a process for determining a setting value of a parameter relating to an image formation process of the image forming device; and a second image stabilization unit for performing single-stage image stabilization when it is determined by said switch determination unit that the information is not stored, the single-stage image stabilization being a process for determining said setting value, wherein in said two-stage image stabilization, a provisional setting value of said parameter is determined within a first adjustable range based on sampling images formed using a plurality of values of said parameter that are different from each other and within said first adjustable range, and said setting value is determined within a second adjustable range narrower than said first adjustable range and including said provisional setting value based on sampling images formed using a plurality of values of said parameter that are different from each other and within said second adjustable range, and in said single-stage image stabilization, said setting value is determined within a third adjustable range including an already determined setting value based on sampling images formed using a plurality of values of said parameter that are different from each other and within said third adjustable range.

2. An image forming device comprising:

a license accepting unit for accepting assignment of a license;

a switching unit for switching a system speed when the assignment of the license has been accepted by said license accepting unit;

a storing unit for storing information indicating that the system speed has been switched when the system speed has been switched by said switching unit;

a switch determination unit for determining whether or not the information indicating that the system speed has been switched is stored in said storing unit;

a first image stabilization unit for performing two-stage image stabilization when it is determined by said switch determination unit that the information is stored and when an amount of change in the system speed is equal to or greater than a first threshold value, the two-stage image stabilization being a process for determining a setting value of a parameter relating to an image formation process of the image forming device;

a second image stabilization unit for performing single-stage image stabilization when it is determined by said switch determination unit that the information is not stored, the single-stage image stabilization being a process for determining the setting value; and a third image stabilization unit for performing said single-stage image stabilization when it is determined by said switch determination unit that the information is stored and when said amount of change in the system speed is equal to or greater than a second threshold value and smaller than said first threshold value, said second threshold value being smaller than said first threshold value, wherein in said two-stage image stabilization, a provisional setting value of said parameter is determined within a first adjustable range based on sampling images formed using a plurality of values of said parameter that are different from each other and within said first adjustable range, and said setting value is determined within a second adjustable range narrower than said first adjustable range and including said provisional setting value based on sampling images formed using a plurality of values of said parameter that are different from each other and within said second adjustable range, in said single-stage image stabilization, said setting value is determined within a third adjustable range including an already determined setting value based on sampling images formed using a plurality of values of said parameter that are different from each other and within said third adjustable range, and when it is determined by said switch determination unit that the information is stored and when said amount of change in the system speed is smaller than said second threshold value, said two-stage image stabilization and said single-stage image stabilization are not performed.

3. The image forming device according to claim 2, wherein said first threshold value is a threshold value for said amount of change in the system speed for which said setting value is required to be determined in a range wider than said third adjustable range by switching of the system speed.

4. The image forming device according to claim 1, further comprising:

a deleting unit for deleting the information stored in said storing unit after said two-stage image stabilization is performed by said first image stabilization unit.

5. The image forming device according to claim 1, wherein said parameter includes a value of a direct voltage applied to a charging device of said image forming device.

6. The image forming device according to claim 1, wherein said parameter includes a value of an alternating voltage applied to a charging device of said image forming device.

7. The image forming device according to claim 1, wherein said parameter includes a value of an alternating developing bias.

8. The image forming device according to claim 1, wherein said parameter includes a value of a direct developing bias.

9. The image forming device according to claim 1, wherein said parameter includes a gamma correction amount.

10. The image forming device according to claim 1, wherein said parameter includes a light intensity of a laser beam forming an electrostatic latent image.

11. The image forming device according to claim 1, wherein said first image stabilization unit determines said provisional setting value based on the sampling images formed using a plurality of values of said parameter that are different from each other at first intervals, and determines said setting value based on the sampling images formed using a plurality of values of said parameter that are different from each other at second intervals narrower than said first intervals, and said second image stabilization unit determines said setting value based on the sampling images formed using a plurality of values of said parameter that are different from each other at third intervals narrower than said first intervals.

12. A method of controlling an image forming device, the method comprising:

accepting assignment of a license;

switching a system speed when the assignment of the license has been accepted;

storing information indicating that the system speed has been switched when the system speed has been switched;

determining whether or not the information indicating that the system speed has been switched is stored;

performing two-stage image stabilization when it is determined that the information is stored, the two-stage image stabilization being a process for determining a setting value of a parameter relating to an image formation process of the image forming device; and performing single-stage image stabilization when it is determined that the information is not stored, the single-stage image stabilization being a process for determining said setting value, wherein in said two-stage image stabilization, a provisional setting value of said parameter is determined within a first adjustable range based on sampling images formed using a plurality of values of said parameter that are different from each other and within said first adjustable range, and said setting value is determined within a second adjustable range narrower than said first adjustable range and including said provisional setting value based on sampling images formed using a plurality of values of said parameter that are different from each other and within said second adjustable range, and in said single-stage image stabilization, said setting value is determined within a third adjustable range including an already determined setting value based on sampling images formed using a plurality of values of said parameter that are different from each other and within said third adjustable range.

13. A non-transitory computer readable recording medium storing a control program of an image forming device, said control program causing a computer to execute:

accepting assignment of a license;

switching a system speed when the assignment of the license has been accepted;

storing information indicating that the system speed has been switched when the system speed has been switched;

determining whether or not the information indicating that the system speed has been switched is stored;

performing two-stage image stabilization when it is determined that the information is stored, the two-stage image stabilization being a process for determining a setting value of a parameter relating to an image formation process of the image forming device; and performing single-stage image stabilization when it is determined that the information is not stored, the single-stage image stabilization being a process for determining the setting value, wherein in said two-stage image stabilization, a provisional setting value of said parameter is determined within a first adjustable range based on sampling images formed using a plurality of values of said parameter that are different from each other and within said first adjustable range, and said setting value is determined within a second adjustable range narrower than said first adjustable range and including said provisional setting value based on sampling images formed using a plurality of values of said parameter that are different from each other and within said second adjustable range, and in said single-stage image stabilization, said setting value is determined within a third adjustable range including an already determined setting value based on sampling images formed using a plurality of values of said parameter that are different from each other and within said third adjustable range.

14. The recording medium according to claim 13, wherein said control program further causes the computer to execute:

deleting the information indicating that the system speed has been switched after said two-stage image stabilization is performed.

15. The recording medium according to claim 13, wherein said parameter includes a value of a direct voltage applied to a charging device of said image forming device.

16. The recording medium according to claim 13, wherein said parameter includes a value of an alternating voltage applied to a charging device of said image forming device.

17. The recording medium according to claim 13, wherein said parameter includes a value of an alternating developing bias.

18. The recording medium according to claim 13, wherein said parameter includes a value of a direct developing bias.

19. The recording medium according to claim 13, wherein said parameter includes a gamma correction amount.

20. The recording medium according to claim 13, wherein said parameter includes a light intensity of a laser beam forming an electrostatic latent image.

21. The recording medium according to claim 13, wherein in said two-stage image stabilization, said provisional setting value is determined based on the sampling images formed using a plurality of values of said parameter that are different from each other at first intervals, and said setting value is determined based on the sampling images formed using a plurality of values of said parameter that are different from each other at second intervals narrower than said first intervals, and in said single-stage image stabilization, said setting value is determined based on the sampling images formed using a plurality of values of said parameter that are different from each other at third intervals narrower than said first intervals.

* * * * *